(12) United States Patent
Chintala

(10) Patent No.: US 11,794,789 B2
(45) Date of Patent: Oct. 24, 2023

(54) ROAD INFORMATION EXCHANGE SYSTEM

(71) Applicant: Sandeep Kumar Chintala, Greenford (GB)

(72) Inventor: Sandeep Kumar Chintala, Greenford (GB)

(*) Notice: Subject to any disclaimer, the term of this patent is extended or adjusted under 35 U.S.C. 154(b) by 373 days.

(21) Appl. No.: 17/284,970

(22) PCT Filed: Oct. 11, 2019

(86) PCT No.: PCT/GB2019/052899
§ 371 (c)(1),
(2) Date: Apr. 13, 2021

(87) PCT Pub. No.: WO2020/074919
PCT Pub. Date: Apr. 16, 2020

(65) Prior Publication Data
US 2021/0387639 A1    Dec. 16, 2021

(30) Foreign Application Priority Data
Oct. 13, 2018    (IN) .............................. 201841038916

(51) Int. Cl.
  *B60W 60/00*    (2020.01)
  *B60W 30/10*    (2006.01)
  *B60W 40/08*    (2012.01)
  *G01C 21/34*    (2006.01)
  *G08G 1/01*     (2006.01)
  *G08G 1/095*    (2006.01)

(52) U.S. Cl.
  CPC .......... *B60W 60/007* (2020.02); *B60W 30/10* (2013.01); *B60W 40/08* (2013.01); *B60W 60/0015* (2020.02); *G01C 21/3415* (2013.01); *G01C 21/3492* (2013.01); *G08G 1/0116* (2013.01); *G08G 1/095* (2013.01); *B60W 2040/0836* (2013.01); *B60W 2040/0872* (2013.01); *B60W 2540/221* (2020.02); *B60W 2540/24* (2013.01); *B60W 2556/45* (2020.02)

(58) Field of Classification Search
  CPC .............. B60W 60/07; B60W 60/015; B60W 2040/0836; B60W 2040/0872; B60W 2540/24; G01C 21/3415; G01C 21/3492; G08G 1/0116; G08G 1/095
  See application file for complete search history.

(56) References Cited

U.S. PATENT DOCUMENTS

| | | | |
|---|---|---|---|
| 9,959,754 B1 | 5/2018 | King | |
| 10,235,882 B1* | 3/2019 | Aoude | G08G 1/0137 |
| 10,595,176 B1* | 3/2020 | Gallagher | G08G 1/096708 |
| 2012/0089994 A1 | 4/2012 | Boland et al. | |
| 2012/0249341 A1 | 10/2012 | Brown | |
| 2019/0266418 A1* | 8/2019 | Xu | G06V 10/457 |
| 2021/0065551 A1* | 3/2021 | Manohar | G08G 1/167 |
| 2021/0387639 A1* | 12/2021 | Chintala | G08G 1/095 |

* cited by examiner

*Primary Examiner* — Peter D Nolan
*Assistant Examiner* — Wae L Louie
(74) *Attorney, Agent, or Firm* — Robert L. Stearns; Dickinson Wright PLLC

(57) ABSTRACT

A road information exchange system includes a plurality of Guided Autonomous Information Network (GAIN) units (102) installed on a road. Each GAIN unit (102) communicates with another GAIN unit (102) of the plurality of GAIN units (102) to divide the road into virtual lanes by formation of microgrids and further communicates with a vehicle passing through the road information exchange system (100).

23 Claims, 3 Drawing Sheets

ROAD INFORMATION EXCHANGE SYSTEM

BACKGROUND

1. Technical Field

The invention relates generally to information exchange systems, and in particular relates to road information exchange systems.

2. Related Art

Division of a road into defined lanes is important consideration for ensuring safe driving on the road. Conventionally, visible lane markings or reflectors are used for separating one lane from the other.

SUMMARY

A road information exchange system included a plurality of Guided Autonomous Network (GAIN) units installed on a road. Each GAIN unit communicates with another GAIN unit of the plurality to divide the road into virtual lanes by formation of microgrids. Each GAIN unit includes one or more sensors for creating virtual boundaries within a proximity zone defined by the microgrids of the plurality of GAIN units and to detect an object within the proximity zone. A processor is provided to log an information of the detected object. A storage unit is provided to store the logged information of the detected object. A communication chipset is provided to communicate with the detected object based on the stored information. Data of health capabilities of each GAIN unit of the plurality of GAIN units is maintained. The data is to build a predictive model using machine learning. The predictive model notifies a GAIN control center even before there is a failure or malfunction within any of the GAIN units.

BRIEF DESCRIPTION OF THE DRAWINGS

The following detailed description references the drawings, wherein.

DETAILED DESCRIPTION

Figure 1:
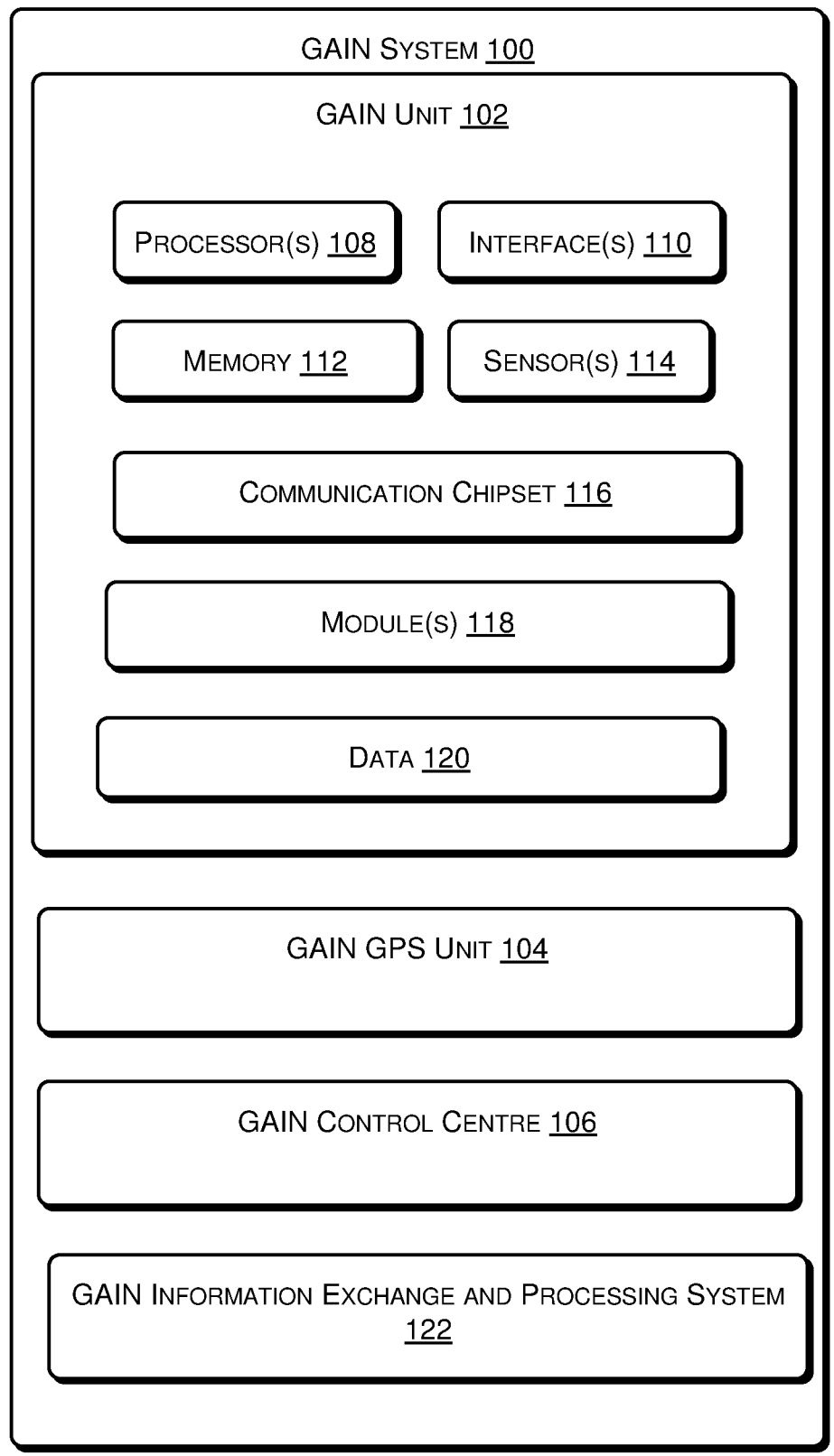
FIG. 1 shows a block diagram of a road information exchange system as per an implementation of the present subject matter.

Autonomous vehicles may have capabilities to function autonomously and communicate with other autonomous and non-autonomous vehicles. However, autonomous vehicles may face difficulty in controlling the information exchange between the vehicles of not just the same manufacturers, but also vehicles from other vehicle manufactures, ride sharing companies, government and regulatory bodies, Global Positioning Service providers, insurance companies, emergency services, traffic management bodies, road and highway maintenance companies, whilst ensuring security of the information being exchanged across all eligible recipients.

Further, communication of the autonomous vehicles with other existing mobility vehicles including non-motorized vehicles is difficult at places wherein an established motoring lane system is not in operation. Due to lack of communication or exchange of information, traffic jams and heavy congestion during peak travel times are often observed.

To this end, a road information exchange system is proposed, which includes, but is not limited to, information exchange and communication between autonomous vehicles, semi-autonomous vehicles, non-autonomous vehicles, non-motorized vehicles, any other road using mobility solutions, and pedestrians using the road. In one example, the road information exchange system is referred to as a Global Automotive/Autonomous Information Network (GAIN) system.

In one implementation of the present subject matter, the road information exchange system includes a plurality of Guided Autonomous Information Network (GAIN) units installed on a road. Each GAIN unit communicates with another GAIN unit of the plurality of GAIN units to divide the road into virtual lanes by formation of microgrids. Each GAIN unit of the plurality of GAIN units includes one or more sensors for creating virtual boundaries within a proximity zone defined by the microgrids of the plurality of GAIN units and to detect an object within the proximity zone. Further, each GAIN unit of the plurality of GAIN units includes a processor to log an information of the detected object, a storage unit to store the logged information of the detected object, and a communication chipset to communicate with the detected object based on the transmit the stored information for exchanging road information.

The GAIN units communicate with each other in electronic, electromagnetic or optical manner. The sensors are capable of creating virtual boundaries within a proximity zone and identifying if object is present within the relevant proximity zone. In one example, the object is a vehicle. In one example, the proximity zone is a GAIN proximity zone. Each GAIN unit of the GAIN system communicates with another GAIN unit(s) of the GAIN system. In one example, each GAIN unit of the GAIN system communicates with the other GAIN units(s) of the GAIN system through a wired communication. In another example, each GAIN unit of the GAIN system communicates with the other GAIN units(s) of the GAIN system through a wireless communication.

In operation, when a vehicle containing a relevant sensor passes through the GAIN proximity zone, the GAIN unit communicates with the vehicle to identify the vehicle and a data entry is logged that the vehicle having the relevant sensor is in the relevant proximity zone and is identified by the GAIN unit sensor(s) at a given point of time. The vehicle also communicates with the AIN unit(s) and notifies about the destination, for which the vehicle is bound for. Further, one GAIN unit is actively communicating with another neighbouring GAIN units to guide the vehicle to the notified destination. In another example of operation, when a vehicle or any other body without a relevant sensor passed through the GAIN proximity zone, the system registers the log registers an unknown entity, along with the rest of the information required to be logged. Through the communication chipset on the GAIN unit, the information logged by the GAIN unit can be transmitted to satellite. In one example, the satellite is a GAIN Global Positioning System (GPS) unit. The satellite then relays the information to a GAIN Control Centre (GCC). The vehicle within the GAIN proximity zone may be using a GAIN GPS unit, which receives traffic information from a GAIN Control Centre (GCC) and GAIN Unit that its travelling through. As each GAIN unit communicate with each other, the user of the GAIN GPS unit could receive lane by lane traffic information, which no other GPS provider currently provide. The logged data entry is transmitted to the satellite by the communication chipset of the GAIN unit. The satellite relays the transmitted data entry to a GAIN Control Centre (GCC). The object within the GAIN proximity zone receives the relayed data entry from the GCC.

In another implementation of the present subject matter, a method for road information exchange is described. The method is performed by the road information exchange system for exchanging road information.

The GAIN system of the present subject matter ensures that the sensors, which are cost effective, small, whilst capable of performing various functions, are used. The GAIN system of the present subject matter ensures communication capabilities among the vehicles (both between autonomous and non-autonomous, and motorized and non-motorized). The GAIN system of the present subject matter not only exchanges information but also ensures security of the information being exchange across all eligible recipients. The GAIN system of the present subject matter provides a feasible solution to traffic jams and heavy congestion during peak travel times.

These and other advantages of the present subject matter would be described in a greater detail in conjunction with the FIGS. 1-2 in the following description. The manner in which the GAIN system is implemented and used shall be explained in detail with respect to the FIGS. 1-2.

It should be noted that the description merely illustrates the principles of the present subject matter. It will thus be appreciated that those skilled in the art will be able to devise various arrangements that, although not explicitly described herein, embody the principles of the present subject matter and are included within its scope. Furthermore, all examples recited herein are intended only to aid the reader in understanding the principles of the present subject matter. Moreover, all statements herein reciting principles, aspects and implementations of the present subject matter, as well as specific examples thereof, are intended to encompass equivalents thereof.

FIG. 1 shows a block diagram of a road information exchange system Global Automotive/Autonomous Information Network (GAIN) system 100 as per an implementation of the present subject matter. The road information exchange system 100 is denoted by a Global Automotive/Autonomous Information Network (GAIN) system 100 hereinafter. The GAIN system 100 includes a plurality of GAIN units 102, a GAIN Global Positioning System (GPS) unit 104, and a GAIN Control Centre (GCC) 106. Each GAIN unit 102 of the plurality of GAIN units 102 includes processors(s) 108, interface(s) 110, storage unit 112, one or more sensors 114, communication chipsets 116, module(s) 118, and data 120. The storage unit 112 is referred to as a memory hereinafter. Example of the processor 108 includes a microcontroller. Each GAIN unit 102 divides a road into grids and virtual tracks. The GAIN unit 102 is implemented as a computing-device, for exchanging road information. The GAIN unit 102 may be implemented as a stand-alone computing device. Examples of such computing devices include microcontrollers or any other form of computing devices. The processor(s) may also be implemented as signal processor(s), state machine(s), logic circuitries, and/or any other device or component that manipulate signals based on operational instructions.

The interface(s) may include a variety of interfaces, for example, interfaces for data input and output devices, referred to as I/O devices, storage devices, network devices, and the like, for communicatively associating the GAIN unit with one or more other peripheral devices. The peripheral devices may be input or output devices communicatively coupled with the GAIN unit 102. The interface(s) may also be used for facilitating communication between the GAIN unit 102 and various other computing devices connected in a network environment. The memory may store one or more computer-readable instructions, which may be fetched and executed for carrying out the road information exchange. The memory may include any non-transitory computer-readable medium including, for example, volatile memory, such as Random Accesses Memory (RAM), or non-volatile memory such as Erasable Programmable Read-Only Memory (EPROM), flash memory, and the like.

The sensors 114 are cost effective, small, whilst capable of performing various functions. One of the sensors 114 on the GAIN unit 102 can be a proximity sensor, infrared, Photoelectric, Reflective Optical Sensors, or similar, capable of creating virtual boundaries within the proximity zone and identifying if any vehicle or body within the relevant proximity zone. Another sensor on the GAIN unit 102 can be a RFID sensor or similar. Each GAIN unit 102 can also be capable of communicating with the neighboring GAIN unit(s) 102 through wired or wireless communication, which can include but not limited to Ethernet connection, Local Area Network (LAN), Wide Area Network (WAN), Bluetooth iBeacon, Wireless Personal Area Network (WPAN), Light Fidelity (Li-Fi), Zigbee, Xibee, Mesh, Radio, Free-space optical, Sonic, EM induction, Laser or any other form of electromagnetic transmission.

The module(s) 118 may be implemented as a combination of hardware and programming (e.g., programmable instructions) to implement one or more functionalities of the module(s) 118.

In examples described herein, such combinations of hardware and programming may be implemented in a number of different ways. For example, the programming for the module(s) may be processor executable instructions stored on a non-transitory machine-readable storage medium and the hardware for the module(s) may include a processing resource (e.g., one or more processors), to execute such instructions. In the present examples, the machine-readable storage medium may store instructions that, when executed by the processing resource, implement module(s) or their associated functionalities. In such examples, the GAIN unit 102 may include the machine-readable storage medium storing the instructions and the processing resource to execute the instructions, or the machine-readable storage medium may be separate but accessible to GAIN unit 102 and the processing resource. In other examples, module(s) 118 may be implemented by electronic circuitry. It should be noted that any other module, upon executing suitable computer readable instructions, may also perform such functions without deviating from the scope of the present subject matter.

When a vehicle containing the relevant sensor 114 passes through a GAIN proximity zone, the GAIN unit 102 communicates with the vehicle to identify the vehicle and a data entry is logged that the vehicle having the relevant sensor is in the relevant proximity zone and is identified by the sensor 114 of the GAIN unit(s) at a given point of time. The vehicle also communicates with the GAIN unit(s) 102 and notifies about the destination, for which the vehicle is bound for. Further, one GAIN unit 102 is actively communicating with another neighbouring GAIN units 102 to guide the vehicle to the notified destination. In one example, the GAIN unit 102 communicates with the object to detect a destination, for which the object is bound for, and one GAIN unit 102 is actively communicating with another neighbouring GAIN unit 102 to guide the object to the detected destination.

In one example, when a vehicle or any other body without a relevant sensor 114 passes through the GAIN proximity zone, the GAIN unit 100 registers the log registers an unknown entity, along with the rest of the information required to be logged. In one example, the information is object related data. Through the communication chipset 116 on the GAIN unit 102, the information logged by the GAIN unit 102 can be transmitted to the GAIN system 100 via the GAIN GPS unit 104 or similar satellite, which then relays the information to the GCC 106. The vehicle within the GAIN proximity zone may be using the GAIN GPS unit 104, which receives traffic information from the GCC 106 and GAIN unit 102 that its travelling through. As each GAIN unit 102 communicate with each other, the user of the GAIN GPS unit 104 could receive lane by lane traffic information, which no other GPS service provider currently provide.

In one example of the present subject matter, a vehicle (autonomous/semi-autonomous/non-autonomous/any type) include one or more sensors that define the boundaries of the vehicle. The sensors on the vehicle, such as but not limited to a proximity sensor continuously communicates with the sensors 114 on the GAIN unit 102 on the road and the response information is sent to the microcontroller of the vehicle, which actively controls the steering/manoeuvrability, acceleration, deceleration and all other aspects of the vehicle. The microcontroller on the vehicle continuously maintains the vehicle within the tracks formed by the GAIN unit 102. In one example, the manoeuvrability can be controlled via steering wheel, gyro sensor or other possible control mechanisms.

In one example of the present subject matter, the GAIN system 100 of the present subject matter improves Adaptive Cruise Control capabilities and Corporative Adaptive Cruise Control feature in any vehicle, including autonomous vehicles. Through the microgrids created by the GAIN units 102 as lane divisions, at any given point in time, the GAIN system 100 ascertains if there is a vehicle or any other body within the microgrid or even moving across the microgrids, in any direction, including unorganised patterns. Similar to the GAIN units 102 ability to form vertical tracks, they can also create a boundaries or horizontal track, that will then prevent a vehicle from moving forward, when the information is relayed from the GAIN unit 102 to the microcontroller within the vehicle. Since each GAIN unit 102 is continuously communicating with another neighbouring GAIN unit 102 at all times, the vehicle can receive advance warning information to decelerate safely to a stop when there is an obstruction ahead. Using advance artificial intelligence and machine learning capabilities, active vehicle health capabilities can be maintained, that can analyse and control every aspect of the vehicle and measure things like traffic flow, battery health, mileage or the distance which the vehicle can travel, tyre pressure and health, brake pads health. The active vehicle health plays an important role and influences how the microcontrollers manages acceleration, deceleration, manoeuvrability of the vehicle. Similar to active vehicle health capabilities, GAIN proximity zone health capabilities can be maintained, that can analyse aspects such as but not limited to individual GAIN proximity zone variable speed limits, sea level, elevations, local weather, humidity, air quality, GAIN proximity zone occupation frequency, road surface health, and vehicle frequency.

The active GAIN proximity zone health can support with better traffic management flow, improved (corporative) adaptive cruise control including acceleration and deceleration management even with the most uneven road surfaces and excessive cornering, dynamic route diversions in case of any disruptions or danger situations.

Similar to active vehicle and GAIN proximity zone health, the GAIN unit 102 health capabilities can be maintained, that can analyse aspects such as health of individual sensors, MCUs, communication chipsets, and any other components on the GAIN unit 102. This data can be utilized to build predictive models using machine learning and notify the GCC 106 even before there is a failure or malfunction within any of the GAIN unit 102.

In another example of the present subject matter, the GAIN system 100 includes a GAIN Information Exchange & Processing System (GIEPS) 122 that acts as an intermediary between all the GAIN Units within a local vicinity, enabling the creation of GAIN Sectors. Towns, cities, states, and countries can be strategically divided into multiple GAIN Sectors, providing the capabilities for plotting a Global GAIN Sector Mapping Capabilities (GGSMC). The GAIN Sectors can be dynamically varied from the GCC or using artificial intelligence or machine learning depending on, but is not limited to, traffic flow, active health data from all units within the GAIN Sectors.

In one example of the present subject matter, the GAIN system 100 communicates with road traffic signals and dynamically adjusts the flow of traffic accordingly.

GIEPS 122 can be physical or virtual, standalone data processing servers, quantum computers managing all the interactions and using Artificial Intelligence (AI)/Machine Learning (ML) sending control instructions between neighboring GIEPS and GAIN Units, GAIN Satellites, National or International GCCs, GAIN Units and Vehicles or other bodies within GAIN Zones, supporting the control of lane centring, ACC/CACC, maneuverability, acceleration and deceleration of vehicles using superfast and highly secure and encrypted data exchange between each other.

In an example of the present subject matter, Autonomous GAIN Robotic Vehicle(s) (AGRV) can used to strategically install GAIN units 102 on newly laid roads. AGRV whether supervised or unsupervised can carry out GAIN Units 102 plotting activity on a new road layout that will enable full functionality of the GAIN System 100 on newly laid out roads. This can also be extended to Cycle paths, pedestrian paths and any other routes where GAIN System 100 can be used. Once the GAIN Units 102 are installed for the 1st lane on a newly laid out roads, additional lanes can be laid out very quickly using the first lane as the guidelines. All newly laid out GAIN Enabled road information is uploaded to all relevant GIEPS 122, GAIN Satellites, GCCs even before the activity starts so that the new road becomes operational and GAIN Proximity Zones come live immediately after the GAIN Units are installed on the new road.

The AGRV is also capable of removing or replacing or uninstalling GAIN units 102 not limited to the ones that are predicted to fail, or unexpectedly fail or get damaged, require upgrading or if a road layout needs to be changed, are not in warranty, or are no longer required in operation.

In one example of the present subject matter, GAIN units 102 can also be laid out for pedestrian and animal paths, cyclist routes and other non-motor vehicles. cycles, push bikes, prams and other non-motor vehicles can contain Radio Frequency Identification (RFID) sensors that will enable the GAIN units 102 to know about their whereabouts and communicate this information with the GIEPS, GAIN Satellites, GCCs.

In one example of the present subject matter, the GAIN units 102 can also be laid out for special service or heavy-duty vehicles where more than one lane on the road may be required and the existing GAIN Proximity Zones can be dynamically altered in order to accommodate these types of vehicles.

In one example of the present subject matter, GAIN Units 102 or GIEPS 122 can interact with traffic signal systems and proactively instruct the vehicles to accelerate, decelerate or come to a complete halt in an effective and controlled motion rather than applying sudden brake or acceleration.

In one example of the present subject matter, GAIN units 102 can be powered by solar photovoltaic cells, or a renewable energy source such as wind, wireless electricity, perpetual energy or any other energy sources.

In one example of the present subject matter, an individual or group of individuals waiting in a GAIN Proximity Zone and wanting to use a GAIN Ride hailing service can use a GAIN Ride hailing app. The GAIN Ride hailing app can interact with a GAIN Satellite or GIEPS 122, using AI/ML locate the nearest or best autonomous/semi-autonomous/non-autonomous vehicle depending the individual(s) requirements such as disability access, comfort or economical or luxury vehicles, option for SUV, saloon, or couple, and all possible options available, buddy access, baby seat(s) requirement, options for vehicle speed, fuel type, options for driver gender preference in case of semi or non-autonomous vehicles, and notify it to arrive at the location of the individual(s). The GAIN Ride Hailing App can utilize bio metric recognitions to validate the user(s) and also to take payments for the ride. The GAIN Ride Hailing App can be access anywhere in the world where GAIN systems 100 are available.

In one example of the present subject matter, the GAIN units 102 can have multi-colored LED lights that can guide non-autonomous, non-motor vehicles that are using GAIN Satellites. They have the ability to dynamically change colors depending on how the traffic conditions, or if the path ahead needs to be blocked, a temporary or permanent road diversion is required.

In one example of the present subject matter, the GAIN units 102 can have textured top surface that cause a driver driving the vehicle over it to realize they are over the GAIN unit 102 that is acting as a lane divider.

In one example of the present subject matter, the autonomous or semi-autonomous vehicles can have sensors to measure vital signs, and other aspects such as alcohol levels using a breathalyzer unit or sensor capable of measuring alcohol levels of the driver/passengers. An intelligence system within the vehicle can continuously monitor these stats and in case of emergency, the vehicle can communicate with the nearest GIEPS 122 and GAIN Satellite and the GIEPS 122 will identify and notify the nearest and capable hospital or ambulance or emergency service and lead the vehicle to the location in the fastest route, whilst adjusting all movements of other vehicles on the road. The GAIN units 102 dynamically adjust the route of the vehicle having the emergency if a non-controllable vehicle or body is predicted to create an obstruction on the way.

Similarly, a GAIN Priority Route can be mapped for any other emergency services, other authorized vehicles travelling on the GAIN enabled roads. If the breathalyzer unit in the vehicle identifies an individual over the legal alcohol limit, then the vehicle can overdrive control into autonomous mode and take the individual to their designated safe location and notify the designated next of kin/appointed person for assistance. If this information is not available, the vehicle can take the individual to the nearest clinic. This feature can be extending to other situations such as individual feeling unwell, which is not classified as an emergency.

In one example of the present subject matter, during police pursuit chasing criminals fleeing in vehicles or crime taking place within a GAIN proximity zone, a GAIN Autonomous Crime Prevention Robot(s) (GACPR) is deployed swiftly to the precise location corresponding to the GAIN proximity zone. The GACPR can act as defence lines in case of riots, barricades for criminal fleeing the location, protective enclosures for humans or other living being perceived to be under attack, or even capture or seize the vehicle in quest ion, especially if they are non-autonomous or non-motorized.

Figure 2A:
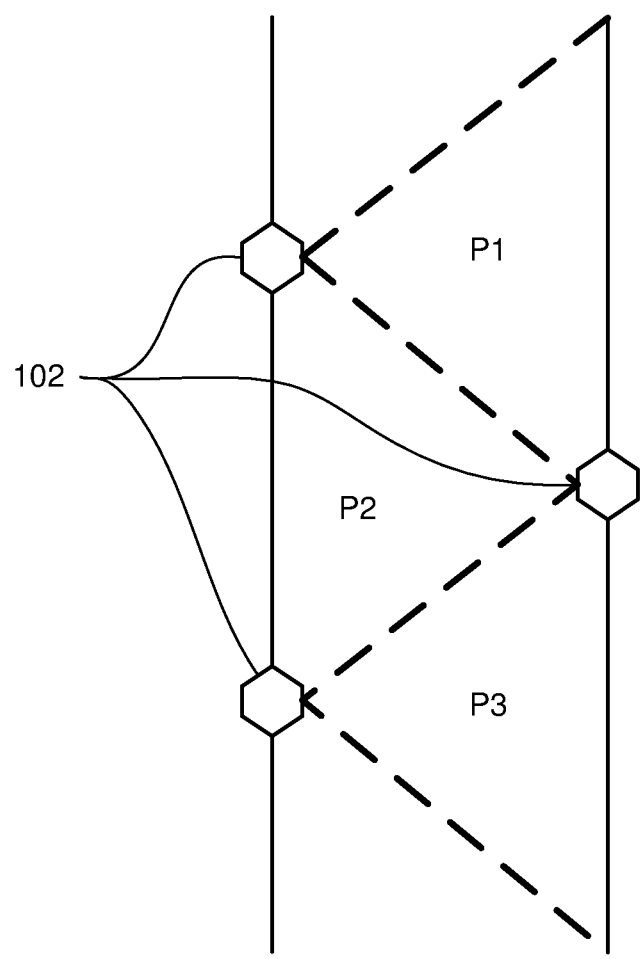
FIG. 2a shows a schematic diagram of a road having Global Autonomous Information Network (GAIN) units installed as per an implementation of the present subject matter.

FIG. 2a shows a schematic diagram of a road having GAIN units 102 installed as per an implementation of the present subject matter. The sensors create virtual boundaries, as shown by dotted lines, within the proximity zones and identifying if the object, such as a vehicle or a body is present within the relevant proximity zone. In one example, the proximity zones are GAIN proximity zones P1, P2 and P3. In one example, the virtual boundaries are of zig-zag pattern.

Figure 2B:
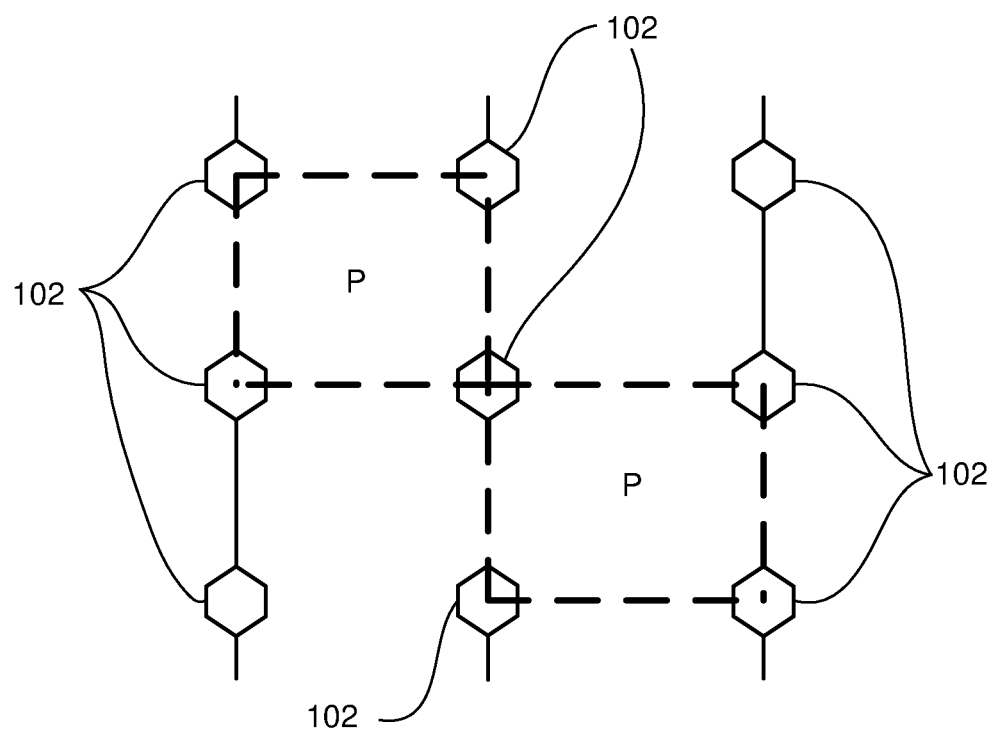
FIG. 2b shows a schematic diagram of road having GAIN units installed as per another implementation of the present subject matter.

FIG. 2b shows a schematic diagram of a road having GAIN units 102 installed as per another implementation of the present subject matter. The sensors create virtual boundaries, as shown by dotted lines, within the proximity zones P and identifying if the object, such as vehicle or a body is present within the relevant proximity zone. In one example, the virtual boundaries are of parallel pattern.

Although implementations for the GAIN system 100 are described, it is to be understood that the present subject matter is not necessarily limited to the specific features described. Rather, the specific features are disclosed as implementations.

I claim:

1. A road information exchange system (100) comprising:
a plurality of Guided Autonomous Information Network (GAIN) units (102) installed on a road, each GAIN unit (102) communicates with another GAIN unit (102) of the plurality of GAIN units (102) to divide the road into virtual lanes by formation of microgrids, wherein each GAIN unit (102) comprises:
one or more sensors (114) for creating virtual boundaries within a proximity zone defined by the microgrids of the plurality of GAIN units (102) and to detect an object within the proximity zone;
a processor (108) to log an information of the detected object;
a storage unit (112) to store the logged information of the detected object; and
a communication chipset (116) to communicate with the detected object based on the stored information for exchanging road information,
wherein data of health capabilities of each GAIN unit (102) of the plurality of GAIN units (102) is maintained, wherein the data is to build a predictive model using machine learning, and wherein the predictive model notifies a GAIN Control Centre (GCC) (106) even before there is a failure or malfunction within any of the GAIN unit (102).

2. The road information exchange system (100) as claimed in claim 1, wherein the object is one of an autonomous vehicle, a semi-autonomous vehicle, a motorized vehicle, and a non-motorized vehicle.

3. The road information exchange system (100) as claimed in claim 2, wherein the autonomous vehicle comprises:
one or more sensors to define boundaries of the autonomous vehicle and to communicate with each of the plurality of GAIN unit (102) for identifying the virtual lanes; and
a microcontroller coupled to the one or more sensors, wherein based on the communication between the one or more sensors and each of the plurality of GAIN units (102), the microcontroller is to control the autonomous vehicle within the virtual lanes.

4. The road information exchange system (100) as claimed in claim 3, wherein the autonomous vehicle is to maintain active vehicle health capabilities based on machine learning and artificial intelligence, wherein the microcontroller is to control the autonomous vehicle based on the maintained active vehicle health capabilities and based on the communication with each of the plurality of GAIN units (102).

5. The road information exchange system (100) as claimed in claim 3, wherein the one or more sensors of the autonomous vehicle are to measure vital signs and alcohol levels of one of a driver and a passenger, wherein the autonomous vehicle includes an intelligent system, coupled to the one or more sensors, to monitor the measured vital signs and alcohol levels,
wherein in case of an emergency detected based on the monitored vital signs and alcohol levels, the intelligent system is to identify and notify a nearest emergency service and to guide the autonomous vehicle to the nearest emergency service via a fastest route.

6. The road information exchange system (100) as claimed in claim 5, wherein the autonomous vehicle is to overdrive control into an autonomous mode in case of the emergency.

7. The road information exchange system (100) as claimed in claim 1, wherein each GAIN unit (102) communicates with the other GAIN unit (102) of the plurality of GAIN units (102) via a wired communication.

8. The road information exchange system (100) as claimed in claim 1, wherein each GAIN unit (102) communicates with the other GAIN unit (102) of the plurality of GAIN units (102) via a wireless communication.

9. The road information exchange system (100) as claimed in claim 1, wherein the GAIN units (102) communicate with each other in at least one of electronic, electromagnetic and optical manner.

10. The road information exchange system (100) as claimed in claim 1, wherein the proximity zone is a GAIN proximity zone.

11. The road information exchange system (100) as claimed in claim 10, wherein when the object passes through a GAIN proximity zone and communicates with the GAIN unit (102), the GAIN unit (102) logs a data entry that the object in the relevant proximity zone is a known entity.

12. The road information exchange system (100) as claimed in claim 11, wherein the GAIN unit (102) communicates with the object to detect a destination, for which the object is bound for, and wherein one GAIN unit (102) is actively communicating with another neighbouring GAIN unit (102) to guide the object to the detected destination.

13. The road information exchange system (100) as claimed in claim 10, wherein when the object passes through the GAIN proximity zone and does not communicate with the GAIN unit (102), the GAIN unit (102) logs a data entry that the object in the relevant proximity zone is an unknown entity along with other object related data.

14. The road information exchange system (100) as claimed in claim 13, wherein the logged data entry is transmitted to a satellite by the communication chipset (116) of the GAIN unit (102), wherein the satellite relays the transmitted data entry to the GCC (106), and wherein the object within the GAIN proximity zone receives the relayed data entry from the GCC.

15. The road information exchange system (100) as claimed in claim 14, wherein the satellite is GAIN Global Positioning System (GPS) unit.

16. The road information exchange system as claimed in claim 1, wherein the GAIN units (102) communicate with each other to receive lane by lane traffic information.

17. The road information exchange system (100) as claimed in claim 1, wherein road information exchange system (100) comprises a GAIN Information Exchange & Processing System (GIEPS) (122), wherein the GIEPS (122) acts as an intermediary between the plurality of GAIN units (102) within a local vicinity for formation of a GAIN Sector.

18. The road information exchange system (100) as claimed in claim 17, wherein the GAIN sector is dynamically varied depending on at least one of traffic flow and health capabilities from the plurality of GAIN units (102) within the GAIN sector.

19. The road information exchange system (100) as claimed in claim 1, wherein each GAIN unit (102) of the plurality of GAIN units (102) is powered by a solar photovoltaic cell.

20. The road information exchange system (100) as claimed in claim 1, wherein each GAIN unit (102) of the plurality of GAIN units (102) is powered a renewable energy source.

21. The road information exchange system (100) as claimed in claim 1, wherein each GAIN unit (102) of the plurality of GAIN units (102) comprises a plurality of multi-colored led lights dynamically changing colors depending on traffic conditions.

22. The road information exchange system (100) as claimed in claim 1, wherein each GAIN unit (102) of the plurality of GAIN units (102) has a textured top surface acting as a lane divider of the road.

23. A method for road information exchange, wherein the method is performed by a road information exchange system (100) a plurality of Guided Autonomous Information Network (GAIN) units (102) installed on a road, each GAIN unit (102) communicates with another GAIN unit (102) of the plurality of GAIN units (102) to divide the road into virtual lanes by formation of microgrids, wherein each GAIN unit (102) comprises:
one or more sensors (114) for creating virtual boundaries within a proximity zone defined by the microgrids of the plurality of GAIN units (102) and to detect an object within the proximity zone;
a processor (108) to log an information of the detected object;
a storage unit (112) to store the logged information of the detected object; and
a communication chipset (116) to communicate with the detected object based on the stored information for exchanging road information,
wherein data of health capabilities of each GAIN unit (102) of the plurality of GAIN units (102) is maintained, wherein the data is to build a predictive model using machine learning, and wherein the predictive model notifies a GAIN Control Centre (GCC) (106) even before there is a failure or malfunction within any of the GAIN unit (102).

\* \* \* \* \*